US012589461B2

(12) United States Patent
Vinco et al.

(10) Patent No.: US 12,589,461 B2
(45) Date of Patent: Mar. 31, 2026

(54) TRANSFER MACHINE

(71) Applicant: GRAZIOLI CESARE S.R.L.,
Carpenedolo (IT)

(72) Inventors: Giuseppe Vinco, Carpenedolo (IT);
Mattia Fezzardi, Carpenedolo (IT);
Claudio Grazioli, Carpenedolo (IT)

(73) Assignee: Grazioli Cesare S.r.l., Carpenedolo (IT)

( * ) Notice: Subject to any disclaimer, the term of this
patent is extended or adjusted under 35
U.S.C. 154(b) by 866 days.

(21) Appl. No.: 17/794,521

(22) PCT Filed: Jan. 19, 2021

(86) PCT No.: PCT/IB2021/050374
§ 371 (c)(1),
(2) Date: Jul. 21, 2022

(87) PCT Pub. No.: WO2021/148936
PCT Pub. Date: Jul. 29, 2021

(65) Prior Publication Data
US 2023/0150082 A1 May 18, 2023

(30) Foreign Application Priority Data

Jan. 21, 2020 (IT) .......................... 102020000001054

(51) Int. Cl.
*B23Q 39/04* (2006.01)
*B21D 19/00* (2006.01)
*B21D 43/14* (2006.01)

(52) U.S. Cl.
CPC ........... B23Q 39/044 (2013.01); B21D 19/00
(2013.01); B21D 43/14 (2013.01); *Y10T*
*29/5129* (2015.01)

(58) Field of Classification Search
CPC ...... B23Q 39/044; B21D 19/00; B21D 41/00;
B21D 43/14; Y10T 29/5124; Y10T
29/5127; Y10T 29/5129; Y10T 29/513
(Continued)

(56) References Cited

U.S. PATENT DOCUMENTS 3,339,440 A * 9/1967 Tsuda ...................... B23B 9/005
82/129
3,891,343 A * 6/1975 Davis ................... B23Q 39/042
408/71
(Continued)

FOREIGN PATENT DOCUMENTS

DE 3524879 C1 7/1986
EP 0290693 A1 * 11/1988 ............... B23B 9/08
(Continued)

OTHER PUBLICATIONS

EPO Machine Translation of DE3524879C1—Stoeckl, Max; "Push-
cut Milling Machine for Machining the End Faces of the Teeth of
Gears or Suchlike Toothed Workpieces"; Jul. 31, 1986.*
(Continued)

*Primary Examiner* — Sunil K Singh
*Assistant Examiner* — Michael Vitale
(74) *Attorney, Agent, or Firm* — Cittone Demers &
Ameri LLP; Henry J. Cittone

(57) ABSTRACT

A transfer machine for cold plastic deformation and/or chip
removal of at least one tubular profile is provided. The
transfer machine has a base, a mounting table, a rotary table,
and a plurality of electromechanical work units installed on
the mounting table. Each electromechanical work unit has a
first advance group having a first advance motor, a first
advance recirculating ball screw, a first advance nut and a
first tubular stem. The first advance recirculating ball screw
is moved by the first advance motor. The first advance nut is (Continued)

engaged by the first advance recirculating ball screw. The first tubular stem, defining advancement and/or positioning of a first tool holder element, is engaged to and made integral with the first advance nut.

17 Claims, 5 Drawing Sheets

(58) Field of Classification Search
USPC .... 29/38 B, 38 C, 38 R, 563; 72/55, 405.03, 72/420, 421, 479
See application file for complete search history.

(56) References Cited

U.S. PATENT DOCUMENTS

| | | | | | |
|---|---|---|---|---|---|
| 5,009,730 | A | * | 4/1991 | Tozier | B29C 63/42 |
| | | | | | 156/85 |
| 5,016,334 | A | * | 5/1991 | Kovalenko | B23Q 5/14 |
| | | | | | 82/129 |
| 5,076,123 | A | * | 12/1991 | McConkey | B23Q 5/048 |
| | | | | | 29/53 |
| 5,090,100 | A | * | 2/1992 | Klett | B23Q 16/025 |
| | | | | | 74/820 |
| 5,111,562 | A | * | 5/1992 | Burka | B23Q 7/08 |
| | | | | | 82/126 |
| 5,325,581 | A | * | 7/1994 | Sun | B23Q 39/042 |
| | | | | | 29/563 |
| 6,119,330 | A | * | 9/2000 | Cheng | B23Q 39/046 |
| | | | | | 29/33 J |
| 6,324,949 | B1 | * | 12/2001 | Link | B23Q 39/044 |
| | | | | | 82/1.11 |
| 6,389,939 | B1 | * | 5/2002 | Babuder | B23Q 11/0883 |
| | | | | | 82/147 |
| 11,590,557 | B2 | * | 2/2023 | Kanazawa | B21F 1/006 |
| 2015/0174722 | A1 | * | 6/2015 | Neth | B23Q 39/044 |
| | | | | | 74/813 R |
| 2018/0369979 | A1 | * | 12/2018 | Passerini | B23Q 16/102 |

FOREIGN PATENT DOCUMENTS

| | | | | | |
|---|---|---|---|---|---|
| JP | 57187131 | A | * | 11/1982 | B21D 43/14 |
| WO | 2018172952 | A1 | | 9/2018 | |

OTHER PUBLICATIONS

International Search Report and Written Opinion, issued in PCT/IB2021/050374, mailed May 7, 2021, Rijswijk, NL.

IPER, issued in PCT/IB2021/050374, mailed Mar. 31, 2022, Munich, DE.

* cited by examiner

TRANSFER MACHINE

CROSS-REFERENCE TO RELATED APPLICATIONS

This application is a National Phase Application of PCT International Application No. PCT/IB2021/050374, having an International Filing Date of Jan. 19, 2021, claiming priority to Italian Patent Application No. 102020000001054, filed Jan. 21, 2020, the disclosures of each of which are hereby incorporated by reference in its entireties.

FIELD OF THE INVENTION

The present invention refers to the field of transfer machines; in particular, the present invention relates to a transfer machine for cold plastic deformation and/or chip removal processing of at least one tubular profile. Such processed tubular profiles are then intended for the technical automotive sector or the thermo-hydraulic sector.

BACKGROUND OF THE INVENTION

Transfer machines for cold forming of tubular profiles using pneumatically or hydrodynamically actuated work units are known in the prior art. Indeed, the transfer machines of the prior art obtain the necessary thrust forces for the cold plastic deformation of tubular profiles with variable diameter and thickness by using pneumatic or hydrodynamic actuators.

Transfer machines that use mixed actuation work units, i.e., partly electromechanical and partly pneumatic/hydrodynamic are also known. Such transfer machines require the electromechanical actuator to be replaced by at least one pneumatic and/or hydrodynamic actuator capable of generating sufficient thrust to deform the tubular profile during the deformation process.

The presence of supply circuits for pressurized fluids is still necessary in both of the aforesaid cases, whether the transfer machine is actuated entirely by actuators fed by pressurized fluids or has a mixed actuation integrating electromechanical and pneumatic/hydrodynamic actuators.

It is known that the presence of conduits or supply circuits for feeding pressurized fluids complicates the design and assembly of the transfer machine. An example of a transfer machine for mechanical processing according to the prior art is described in WO2018/172952A1.

Disadvantageously, a transfer machine comprising circuits for pressurized fluids is not only structurally complex but also dangerous. Indeed, the mechanical components delivering pressurized fluids require higher safety standards, continuous monitoring and frequent maintenance. Compliance with such safety standards results in higher costs to ensure the correct and safe operation of the transfer machine.

SUMMARY OF THE INVENTION

It is the object of the present invention to suggest a transfer machine for cold plastic deformation and/or chip removal processing capable of avoiding, at least in part, the drawbacks complained above relative to the transfer machines according to the prior art.

Said object is achieved by a transfer machine for cold plastic deformation and/or chip removal processing as described and claimed herein. Preferred embodiments of the present invention are also described.

BRIEF DESCRIPTION OF THE FIGURES

The features and advantages of the transfer machine according to the invention will be apparent from the following description which illustrates preferred embodiments, given by way of indicative, non-limiting examples, with reference to the accompanying figures, in which.

DETAILED DESCRIPTION

Figure 1:
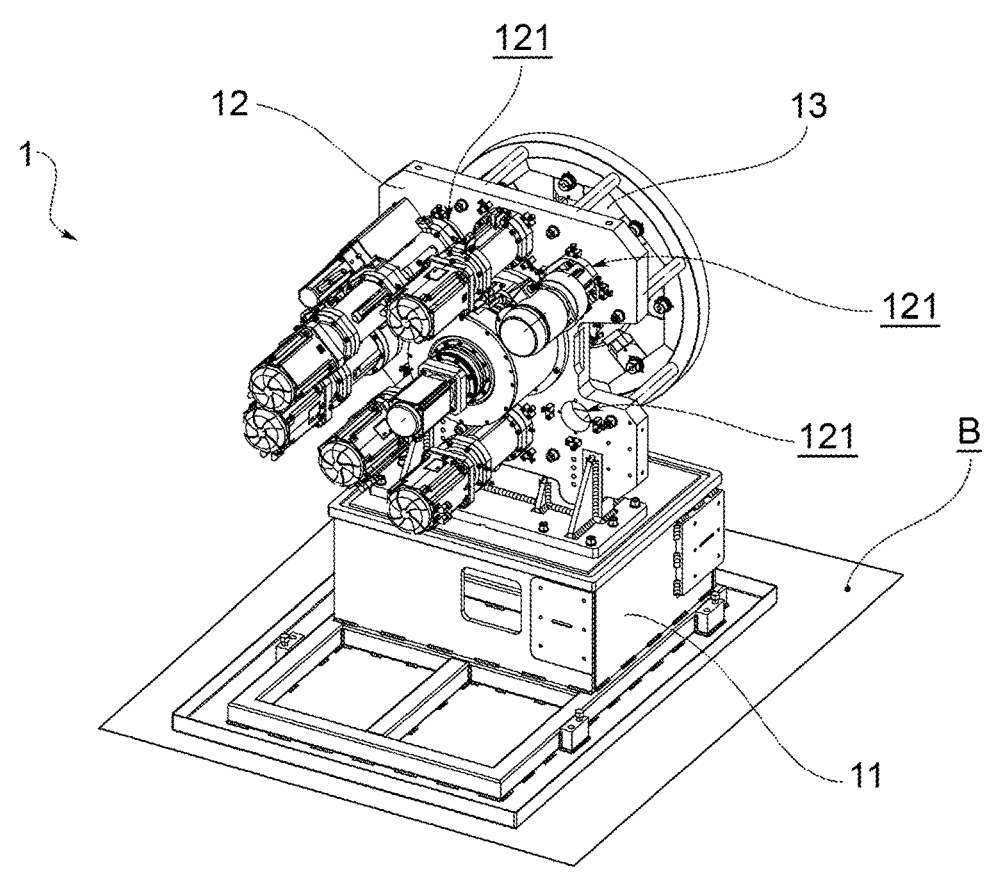
FIG. 1 shows a perspective view of a transfer machine according to the invention.
Figure 2:
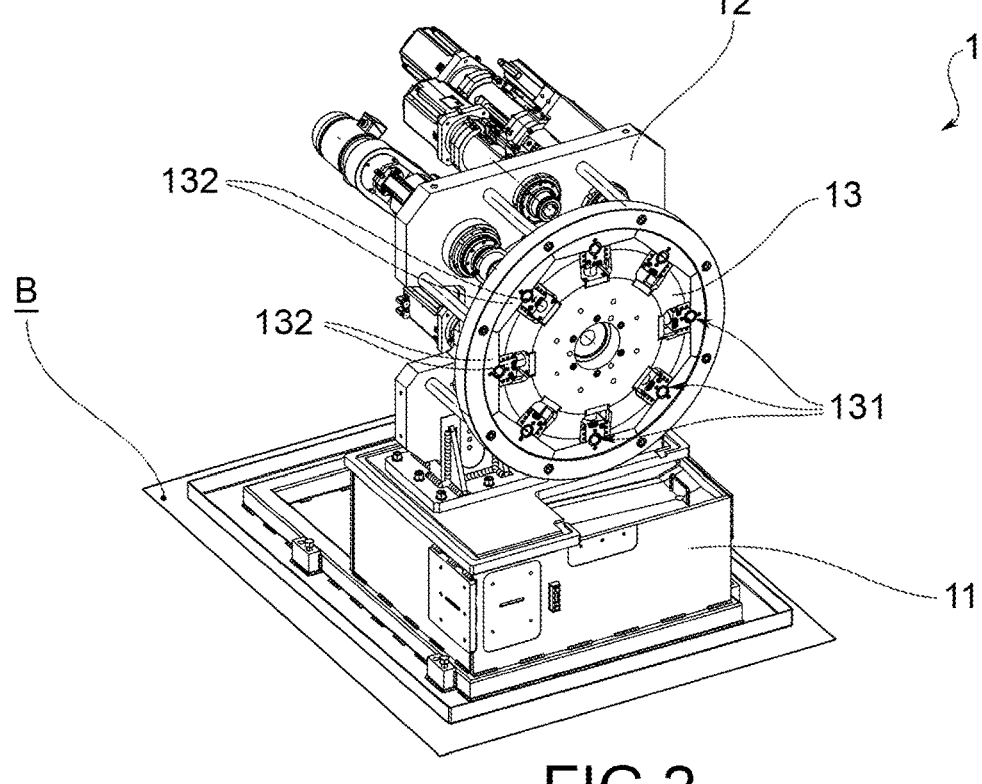
FIG. 2 shows a further perspective view of the transfer machine in FIG. 1.

In said drawings, a transfer machine according to the invention is indicated by reference numeral 1 as a whole.

In a general embodiment, a transfer machine 1 for cold plastic deformation and/or chip removal processing of at least one tubular profile is suggested. Such a transfer machine comprises a base 11, a mounting table 12, a rotary table 13 and a plurality of electromechanical work units 2;3;4;5. The base 11 allows the resting on a base surface B. The mounting table 12 is fixed and arranged orthogonally to the base plane B. The rotary table 13 faces the mounting table. The electromechanical work units 2;3;4;5 are installed on said mounting table 12.

The rotary table 13 comprises a plurality of work stations 131, where each work station of said plurality of work stations comprises a vise 132 for clamping the tubular profile.

According to an embodiment, the vise 132 comprises a pair of half-jaws, wherein the first half-jaw of said pair of half-jaws is fixed and the second half-jaw is movable.

Advantageously, the movable half-jaw adapts to the possible variations of the diameter of the tubular profile to be processed, making the transfer machine flexible relative to the various types of tubular profiles.

According to an aspect of the invention, a plurality of housing seats 121 are formed in the mounting table 12 and each housing seat of such a plurality of housing seats 121 faces a respective work station. Each housing seat is further suitable for accommodating an electromechanical work unit of said plurality of electromechanical work units.

Each electromechanical work unit 2;3;4;5 comprises a first advance group 21;31;41;51. Such a first advance group comprises, in turn, a first advance motor 22;32;42;52, a first advance recirculating ball screw 23;33;43;53, a first advance nut 24;34;44;54 and a first tubular stem 25;35;45;55.

According to an embodiment, the first advance motor 22;32;42;52 is electric.

According to an aspect of the invention, the first advance recirculating ball screw 23;33;43;53 is moved by the first advance motor and extends along a first advance screw axis V' which is substantially orthogonal to the mounting table 12. The first advance nut 24;34;44;54 is engaged by the first advance recirculating ball screw and is translable along the first advance screw axis V'. The first tubular stem 25;35;45; 55 extends between a first stem proximal end 25';35';45';55' and a first stem distal end 25";35";45";55". The first stem proximal end is engaged to the first advance nut and made integral therewith while the first stem distal end is suitable for defining the advancement and/or positioning of a first tool holder element 36;46;56.

In the present discussion, the term "proximal" identifies an element which is close to, or that stretches towards a generic motor member. Conversely, the term "distal" identifies an element which is far, or distanced, from the generic motor member.

According to an embodiment, the at least one tubular profile is made of a material belonging to the steel or aluminum alloy family.

Figure 3:
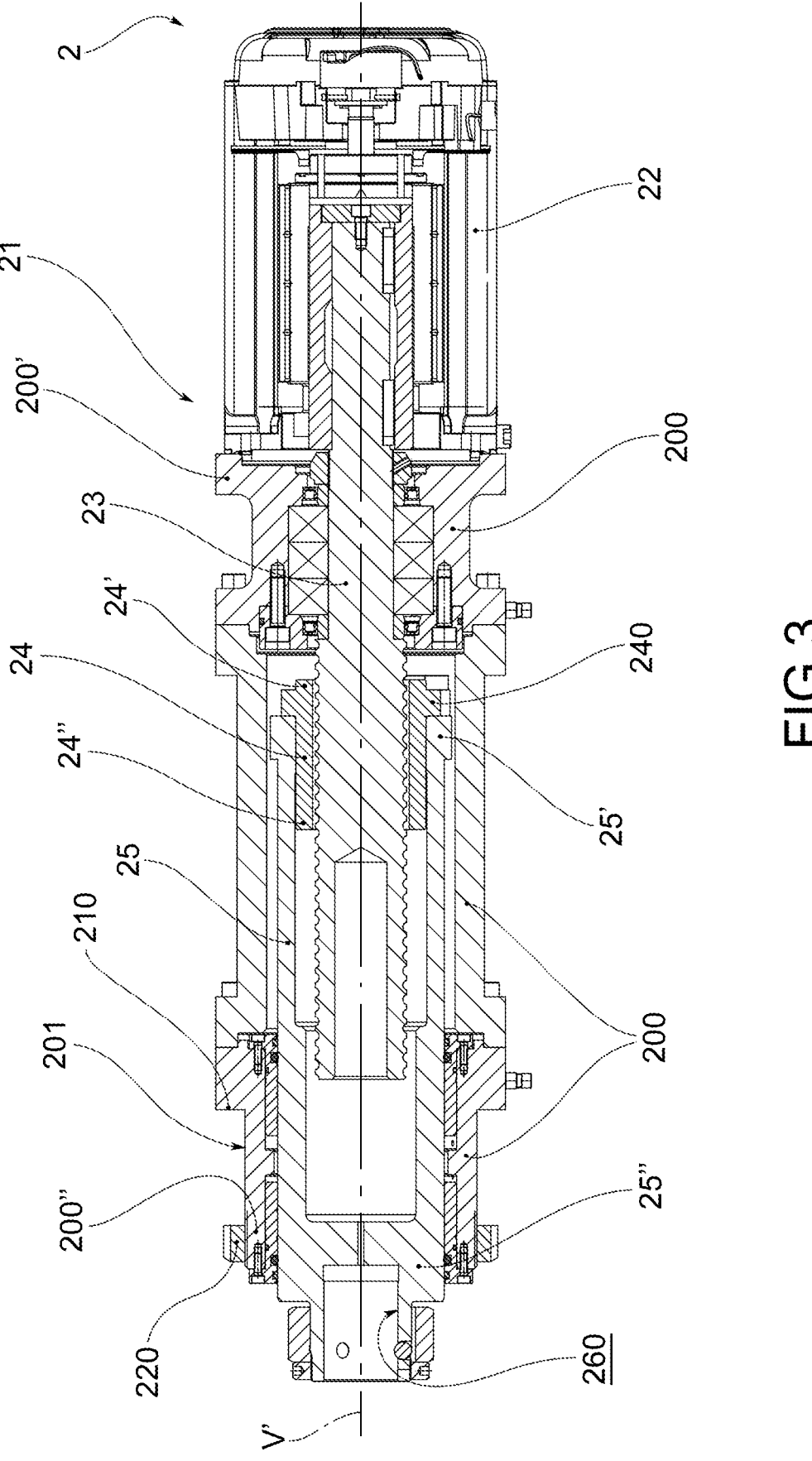
FIG. 3 shows an electromechanical work unit according to a further embodiment.
Figure 4:
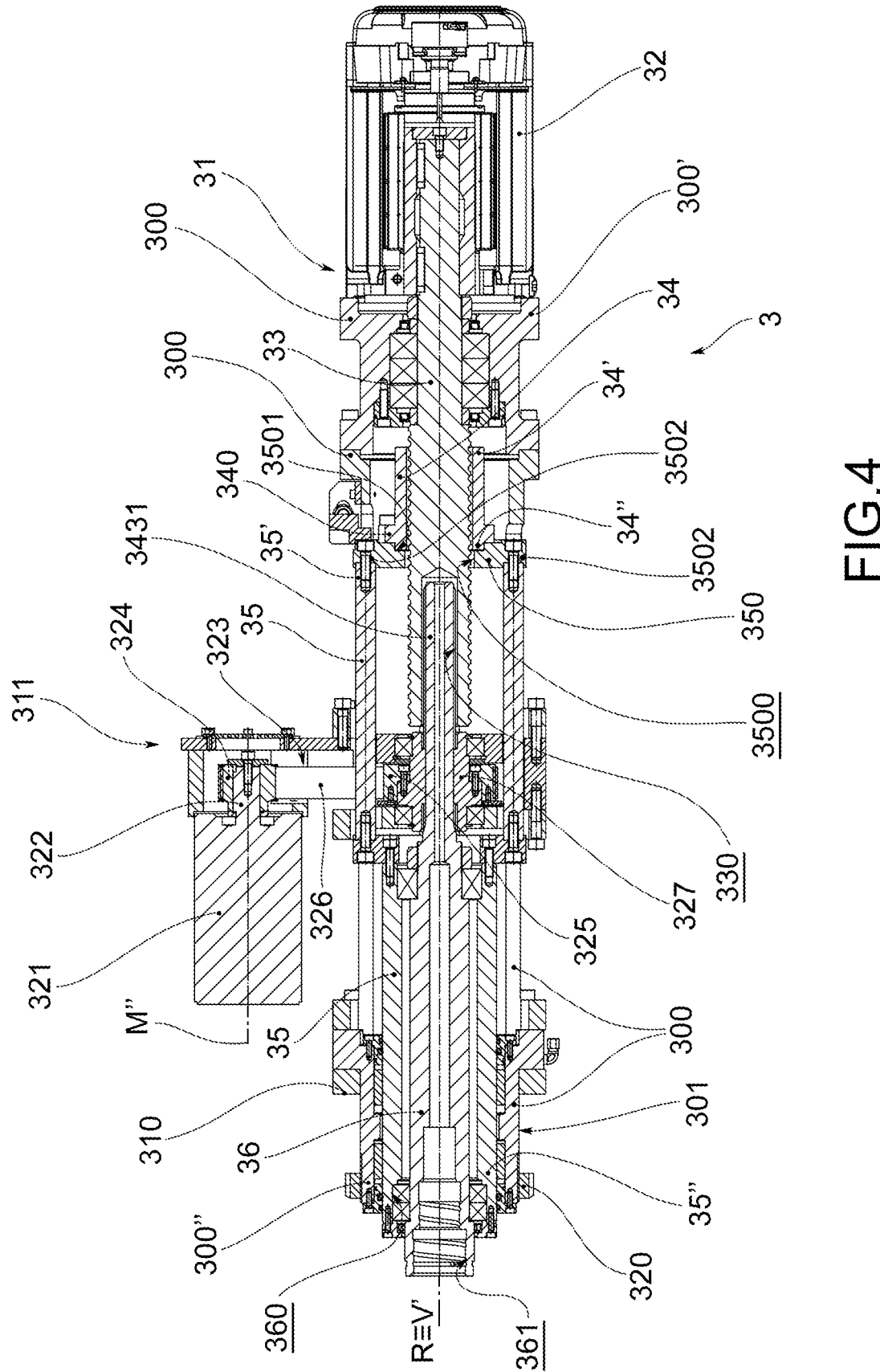
FIG. 4 shows the electromechanical work unit according to a further embodiment.
Figure 6:
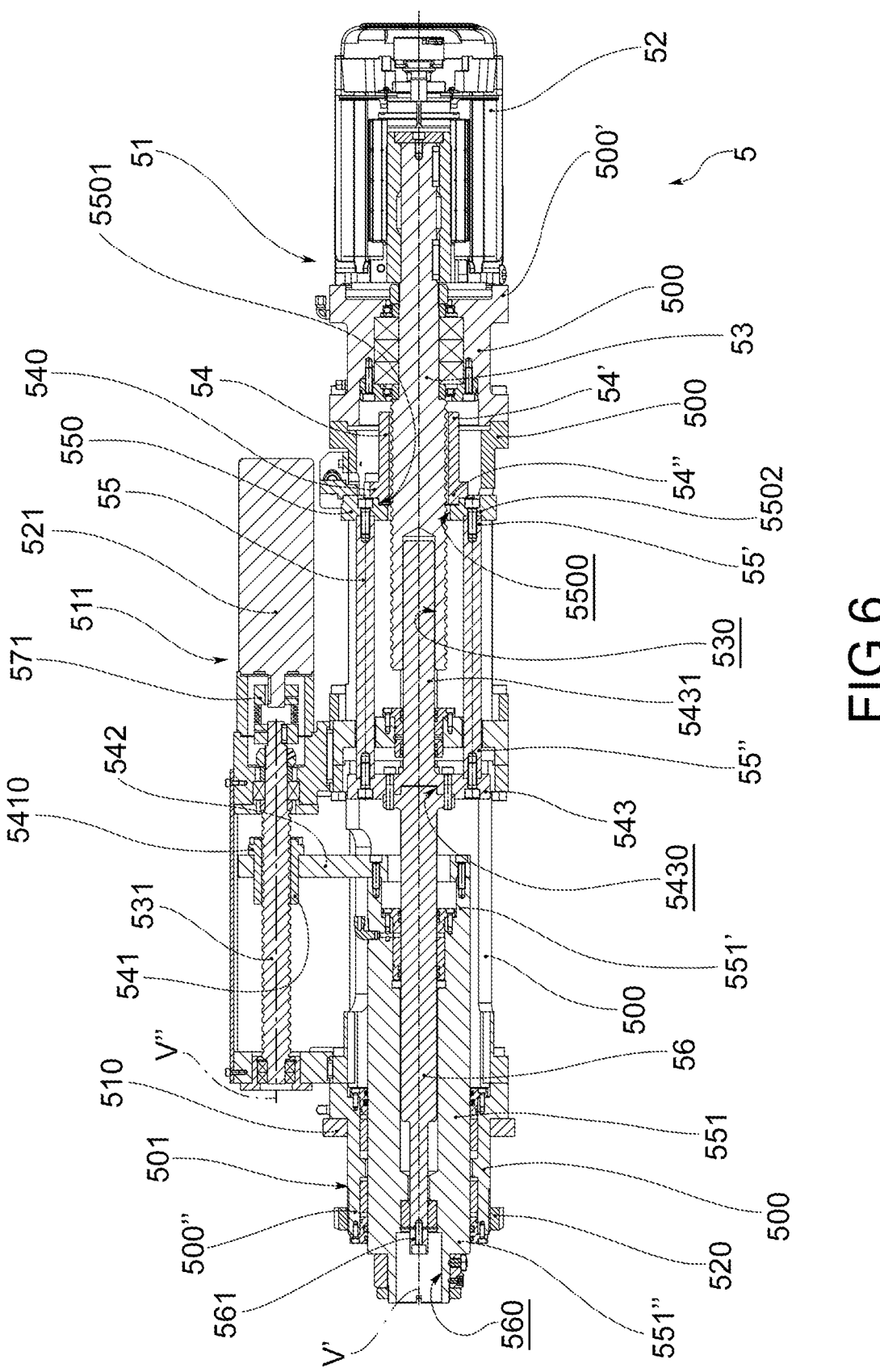
FIG. 6 shows the electromechanical work unit according to a further embodiment.

According to an embodiment shown in the accompanying FIGS. 3, 4 and 6, the first advance motor 22;32;52, the first advance recirculating ball screw 23;33;53, the first advance nut 24;34;54 and the first tubular stem 25;35;55 are coaxial.

According to the embodiment shown in FIG. 3, the electromechanical work unit 2 has a maximum linear stroke of 150 mm.

Figure 5:
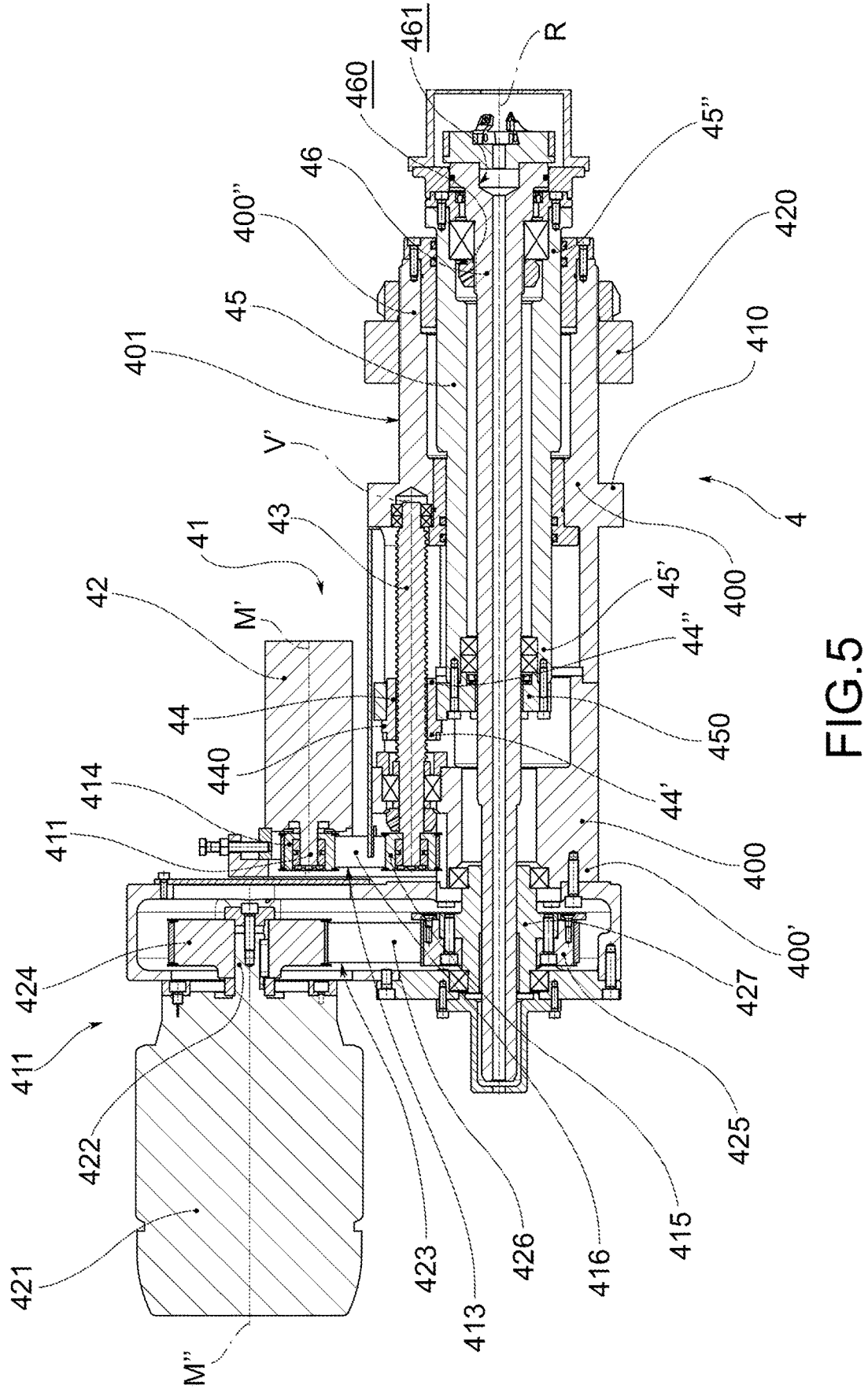
FIG. 5 shows the electromechanical work unit according to a yet further embodiment.

According to an embodiment shown in the accompanying FIGS. 4 and 5, the at least one electromechanical work unit 3;4 further comprises a rotation group 311;411. Said rotation group 311;411 comprises a rotation motor 321;421, a first tool holder element 36;46 and a rotation motion transmission system 323;423. The rotation motor 321; 421 comprises, in turn, a rotation motor shaft 322;422 which extends along a rotation motor axis M'' parallel to the first advance screw axis V'. The first tool holder element 36;46 is provided with a tool holder element hub 327;427. The rotation motion transmission system 323;423 comprises transmission means suitable for connecting the rotation motor 321;421 to the tool holder element hub 327;427. In particular, the tool holder element hub 327;427 defines the rotation of the first tool holder element 36;46 about a tool holder element rotation axis R which is either parallel or coaxial to the first advance screw axis V'.

According to the accompanying FIGS. 4 and 5, the transmission means comprise a rotation driving pulley 324; 424, a rotation driven pulley 325;425, and a rotation transmission belt 326;426. The rotation driving pulley 324;424 is engaged to the rotation motor shaft 322;422. The rotation transmission belt 326;426 allows the transmission of rotation motion from the rotation driving pulley 324;424 to the rotation driven pulley 325;425. In detail, the tool holder element hub 327; 427 is engaged to the rotation driven pulley 325;425 and made integral therewith.

According to the embodiment shown in FIG. 4, the electromechanical work unit 3 is suitable for generating a rototranslational motion. In particular, the first advance motor 32 generates an axial thrust motion with a maximum stroke of 150 mm, while the rotation motor 321 defines the rotation of the first tool holder element 36. The tool holder element hub 327 is further keyed onto the first tool holder element 36 to define the rotation of said first tool holder element 36 about the tool holder element rotation axis R.

According to an embodiment, the first tubular stem 35 comprises a first stem first portion and a first stem second portion. The first stem first portion extends from the first stem proximal end 35' and the first stem second portion terminates with the first stem distal end 35''. The cross-section dimensions of the first stem first portion are different from the cross-section dimensions of the second stem second portion. Furthermore, the first stem first portion is connected to the first stem second portion by a stem connection flange.

According to the embodiment shown in FIG. 5, the electromechanical work unit 4 is suitable for generating a rototranslational motion. In particular, the first advance motor 42 generates an axial position motion with a maximum stroke of 100 mm, while the rotation motor 421 defines the rotation of the first tool holder element 46. The tool holder element hub 427 is further keyed onto the first tool holder element 46 to define the rotation of said first tool holder element 46 about the tool holder element rotation axis R.

According to the embodiment shown in FIG. 6, the at least one electromechanical work unit 5 further comprises a second advance group 511. Said second advance group 511 comprises a second advance motor 521, a second advance recirculating ball screw 531, a second advance nut 541, a second advance flange 542 and a second tubular stem 551.

The second advance recirculating ball screw 531 extends along a second advance screw axis V'' which is parallel to the first advance screw axis V'. Furthermore, such a second advance recirculating ball screw is moved by the second advance motor 521. The second advance nut 541 is engaged by the second advance recirculating ball screw 531 and is translable along the second advance screw axis V''. The second advance flange 542 is engaged to the second advance nut 541 and made integral therewith. The second tubular stem 551 extends between a second stem proximal end 551' and a second stem distal end 551''. The second stem proximal end is engaged to the second advancement flange 542 and made integral therewith while the second stem distal end is suitable for defining the advancement and/or positioning of a second tool holder element. In particular, the second tubular stem 551 is coaxial to the first tubular stem 55.

The electromechanical work unit 5 shown in FIG. 6 is suitable for generating two mutually independent axial motions. In detail, the first axial thrust motion is generated by means of the first tubular stem 55 while the second axial thrust motion is generated by the second tubular stem 551. It is worth noting that the order of performance of the two axial motions is reversible, i.e., the thrust of the first tubular stem 55 may precede that of the second tubular stem 551 or vice versa.

According to the embodiment shown in FIG. 6, the electromechanical work unit 5 is suitable for generating two independent axial motions to perform two different deformation processes on the tubular profile, e.g. an external deformation and an internal deformation of the tubular profile. In detail, the stroke of the first tubular stem 55 and/or second tubular stem 551 varies from a minimum of 49 mm to a maximum of 160 mm.

According to an embodiment, the first advance nut 24;34; 44;54 is substantially a hollow cylinder which extends between an advance nut proximal end 24';34';44';54' and a first advance nut distal end 24'';34'';44'';54''. The first advance nut 24;34;44;54 is further provided with a first collar 240;340;440;540 which protrudes radially outwards and is formed at the first advance nut proximal end (FIGS. 3 and 5) or the first advance nut distal end (FIGS. 4 and 6). In other words, when the first collar protrudes from the first advance nut distal end, the first advance nut is substantially reverse mounted.

Advantageously, it is possible to reduce the axial dimensions of the electromechanical work unit when the first advance nut is mounted upside down.

Furthermore, the first collar 240;340;440;540 defines an engagement surface for the first stem proximal end 25' or for a first advance flange 350;450;550 which is engaged to both the first advance nut 24;34;44;54 and the first stem proximal end 35';45';55' and made integral therewith.

According to an embodiment shown in FIGS. 4 and 6, the first advance flange 350;550 is axially symmetrical. In particular, a first flange hole 3500;5500 is engaged by the first advance recirculating ball screw 33;53 is centrally formed in the first advance flange 350;550. Said first flange hole 3500;5500 comprises a stepped chamfer 3501;5501 suitable for engaging the first advance flange 350;550 to the first advance nut 34;54 and make it integral therewith. The first advance flange 350;550 is further delimited by a first flange perimeter region 3502;5502 suitable for engaging the first advance flange 350;550 to the first stem proximal end 35';55' and make it integral therewith.

According to an embodiment, the first tool holder seat 260;360;460 is formed at the first stem distal end 25";35"; 45".

According to the accompanying FIGS. 3, the first tool holder seat 260 is suitable for housing a plastic deformation unit or a chip removal unit. For example, the plastic deformation unit is a rolling unit, or a heading, rounding or facing unit.

According to the accompanying FIGS. 4 and 5, the first tool holder seat 360;460 is suitable for housing the first tool holder element 36;46. Such a first tool holder element 36;46 is suitable for being removably equippable with at least one tool for cold plastic deformation or for chip removal of the tubular profile.

According to the embodiment shown in FIGS. 4 and 5, the first tool holder element 36;46 is a shaft in which a tool seat 361;461 is centrally formed suitable for housing a forming unit or a chip removal unit.

According to the embodiment in FIG. 6, the first tool holder element 56 forms releasable coupling means 561, e.g. a shape coupling, by interference or bolted with the deformation unit.

According to the embodiment shown in FIG. 6, the first stem distal end 55" is engaged to an advance flange tool holder element 543 and made integral therewith. A blind tool holder element 5430 housing the first tool holder element 56 is obtained in the advance flange of tool holder element 543.

Advantageously, the tool element seat 5430 promotes the centering of the first tool element 56 relative to the tool holder element advance flange 543.

The tool holder element advance flange 543 is further integral with the first tool holder element 56 and is provided with a centering tang 5431 which protrudes proximally towards the first advance motor 52 along the first advance screw axis V'. Said centering tang 5431 is at least partially housed in a recess 530 obtained in the first advancement recirculating ball screw 53. Said recess 530 is circumferentially delimited by a recess wall and the centering tang 5431 is never in contact with said recess wall. In other words, the recess 530 is simply a notch for housing the centering tang 5431 and there is no contact between the centering tang 5431 and the recess wall.

According to the embodiment shown in FIG. 6, the second advance motor 521 is engaged to the second advance recirculating ball screw 531 by means of a bellows joint 571.

Advantageously, the bellows joint allows the correction of possible misalignments between the second advance motor and the second advance recirculating ball screw. Therefore, the bellows joint facilitates the assembly of the electromechanical work unit.

According to a further advantageous aspect, the bellows joint improves the torsional resistance at the interface between the second advance motor and the second advance recirculating ball screw.

According to the accompanying FIG. 6, the second advance nut 541 is provided with a second collar 5410 suitable for engaging the second advance nut 541 and make it integral with the second advance flange 542.

According to an embodiment shown in FIG. 6, a second tool holder seat 560 suitable for housing the second tool holder element is obtained at the second stem distal end 551". Such a second tool holder element is removably equippable with at least one tool for plastic deformation or for chip removal of the tubular profile.

According to an embodiment shown in FIG. 5, the transfer machine further comprises a first rotation motion transmission system 413. Such a first rotation motion transmission system 413 comprises a first rotation driving pulley 414, a first rotation driven pulley 415 and a first rotation transmission belt 416. The first rotation driving pulley 414 is engaged to a first rotation driving shaft 411 of the first advance motor 42. The first rotation transmission belt 416 transmits the motion from the first rotation driving pulley 414 to the first rotation driven pulley 415. Furthermore, the first rotation driven pulley 415 is engaged to the first advancement recirculating ball screw 43 and made integral therewith. The first rotation driving shaft 411 extends along a first advance motor axis M' which is either parallel to or coincident with the first advance screw axis V'.

According to the embodiment shown in the accompanying FIG. 4, the first tool holder element 36 is provided with a first centering tang 3431 protruding proximally towards the first advance motor 32 along the first advance screw axis V'. Said first centering tang 3431 is at least partially housed in a first recess 330 obtained in the first advancement recirculating ball screw 33. Said first recess 330 is circumferentially delimited by a first recess wall and the first centering tang 3431 is never in contact with said first recess wall. In other words, the first recess 330 is simply a notch for housing the first centering tang 3431 and there is no contact between the first centering tang 3431 and the first recess wall.

According to an embodiment, each electromechanical work unit 2;3;4;5 comprises an external covering frame 200;300;400;500 made of anodized aluminum, e.g. aluminum of the 7000 series. In particular, the external covering frame is made of hard-anodized aluminum. The hard anodizing process makes it possible to obtain a hardened surface layer with a depth comprised between 20 and 35 microns.

Advantageously, the external covering frame, being made of aluminum, allows obtaining an electromechanical work unit, which is light enough to be installed cantilevered in the housing of the mounting table.

According to a further advantageous aspect, the external covering frame, being made of anodized aluminum, allows obtaining a good compromise between superficial hardness and lightness.

According to an embodiment shown in the accompanying FIGS. 3, 4 and 6, the first advance motor 22;32;52 is a hollow shaft motor.

According to an embodiment, each electromechanical work unit 2;3;4;5 comprises an external covering frame 200;300;400;500 which extends between a proximal frame portion 200';300';400';500' and a distal frame portion 200"; 300";400";500". The distal frame portion 200";300";400"; 500" comprises an external cylindrical surface 201;301;401; 501 proximally delimited by a shoulder 210;310;410;510, or a spacer, and distally delimited by a locking ring nut 220;320;420;520. The space region extending between the shoulder 210;310;410;510, or the spacer, and the locking ring nut 220;320;420;520 is suitable for being housed in one of the plurality of housing seats 121 of the mounting table 12. In particular, the locking ring nut 220;320;420;520 is screwed onto the external cylindrical surface 201;301;401; 501 until it comes into contact with the surface of the mounting table 12 facing the rotary table 13. Instead, the shoulder 210;310;410;510 abuts onto the surface of the mounting table 12 opposite to the surface facing the rotary table 13. In this manner, each electromechanical work unit is installed and locked in one of the plurality of housing seats 121.

Innovatively, the transfer machine according to the present invention complies with the intended purpose; indeed, it comprises fully electromechanical work units which do not suffer from the disadvantages due to the presence of pneumatic or hydrodynamic actuators discussed above. In other words, the transfer machine according to the present invention is suitable for plastically deforming a tubular profile by means of electromechanically actuated work units without the need for pneumatically or hydrodynamically actuated actuators. The force generated by the electromechanical work units is sufficient to eliminate the presence of pressurized fluid and the respective control unit.

Furthermore, the transfer machine is safe, because it comprises only electromechanical work units capable of generating sufficient thrust force to deform the tubular profile. In other words, the electromechanical work units do not require the additional presence of pneumatic/hydrodynamic actuators or, in any case, of components subjected to the action of pressurized fluid.

The second advantage is that the transfer machine allows a reduction in costs due to the fact that the work units are completely electromechanical. The structure of the transfer machine is simplified because the electromechanical work units are not equipped with oil or fluid pressure tanks, control units or oil/fluid recovery systems. A further cost reduction is attributable to the fact that there is no need to dispose of the waste oil produced by the use of electromechanical work units and that the transfer machine requires less monitoring and maintenance than a transfer machine with completely pneumatic or hydrodynamic actuation.

In a further advantageous aspect, the electromechanical work unit is suitable for generating a deformation thrust of up to 7000 kg.

A person skilled in the art may make changes and adaptations to the embodiments of the transfer machine according to the invention or can replace elements with others which are functionally equivalent to satisfy contingent needs without departing from the scope of protection of the following claims. All the features described above as belonging to one possible embodiment may be implemented independently from the other described embodiments.

The invention claimed is:

1. A transfer machine for cold plastic deformation and/or chip removal of at least one tubular profile, comprising:
a base for resting on a base plane;
a mounting table fixed and arranged orthogonally to the base plane;
a rotary table facing the mounting table; and
a plurality of electromechanical work units installed on said mounting table,
wherein the rotary table comprises a plurality of work stations, wherein each work station of said plurality of work stations comprises a vise for clamping the at least one tubular profile,
a plurality of housing seats being formed in the mounting table, wherein each housing seat of said plurality of housing seats faces a respective work station and is suitable for accommodating an electromechanical work unit of said plurality of electromechanical work units, each electromechanical work unit comprising a first advance group, wherein the first advance group of each electromechanical work unit comprises:
a first advance motor, wherein said first advance motor is electric;
a first advance recirculating ball screw moved by the first advance motor and extending along a first advance screw axis orthogonal to the mounting table;
a first advance nut engaged by the first advance recirculating ball screw and translatable along the first advance screw axis; and
a first tubular stem extending between a first stem proximal end and a first stem distal end, the first stem proximal end being engaged to and made integral with the first advance nut, the first stem distal end being suitable for defining advancement and/or positioning of a first tool holder element,
wherein the first advance motor is a hollow shaft motor, and
wherein each electromechanical work unit comprises an external covering frame made of anodized aluminum, the external covering frame allowing obtaining electromechanical work units light enough to be installed cantilevered in the housing seats of the mounting table.

2. The transfer machine of claim 1, wherein the first advance motor, the first advance recirculating ball screw, the first advance nut and the first tubular stem are coaxial.

3. The transfer machine of claim 1, wherein at least one electromechanical work unit further comprises a rotation group comprising:
a rotation motor comprising a rotation motor shaft extending along a rotation motor axis parallel to the first advance screw axis;
the first tool holder element provided with a tool holder element hub; and
a rotation motion transmission system comprising transmission means for connecting the rotation motor to the tool holder element hub,
said tool holder element hub defining rotation of the first tool holder element about a tool holder element rotation axis either parallel or coaxial to the first advance screw axis.

4. The transfer machine of claim 3, wherein the transmission means comprise a rotation driving pulley engaged to the rotation motor shaft, a rotation driven pulley and a rotation transmission belt for transmitting rotation motion from the rotation driving pulley to the rotation driven pulley, the tool holder element hub being engaged to and made integral with the rotation driven pulley.

5. The transfer machine of claim 3, wherein the first tool holder element is a shaft, and a tool seat for housing a plastic deformation unit or a chip removal unit is centrally formed in said shaft.

6. The transfer machine of claim 3, wherein the first tool holder element is provided with a first centering tang proximally protruding towards the first advance motor along the first advance screw axis, said first centering tang being at least partially housed in a first recess formed in the first advance recirculating ball screw.

7. The transfer machine of claim 1, wherein at least one electromechanical work unit further comprises a second advance group comprising:
a second advance motor;
a second advance recirculating ball screw extending along a second advance screw axis parallel to the first advance screw axis, said second advance recirculating ball screw being moved by the second advance motor;

a second advance nut engaged by the second advance recirculating ball screw and translatable along the second advance screw axis;

a second advance flange engaged to and made integral with the second advance nut; and a second tubular stem extending between a second stem proximal end and a second stem distal end, the second stem proximal end being engaged to and made integral with the second advance flange, the second stem distal end being suitable for defining advancement and/or positioning of a second tool holder element, said second tubular stem being further coaxial with the first tubular stem.

8. The transfer machine of claim 7, wherein the second advance motor is engaged to the second advance recirculating ball screw by a bellows joint.

9. The transfer machine of claim 7, wherein the second advance nut is provided with a second collar configured to engage the second advance nut and make the second advance nut integral with the second advance flange.

10. The transfer machine of claim 7, wherein a second tool holder seat suitable for housing the second tool holder element is formed at the second stem distal end, the second tool holder element being removably providable with at least one tool for plastic deformation or chip removal of the at least one tubular profile.

11. The transfer machine of claim 1, wherein the first advance nut is a hollow cylinder extending between a first advance nut proximal end and a first advance nut distal end, the first advance nut being provided with a first collar radially protruding outwards and formed at the first advance nut proximal end or at the first advance nut distal end, the first collar defining an engagement surface for the first stem proximal end or for a first advance flange engaged to and made integral with the first advance nut and the first stem proximal end.

12. The transfer machine of claim 11, wherein the first advance flange is axially symmetric, and a first flange hole is centrally formed in the first advance flange, said first flange hole being engaged by the first advance recirculating ball screw and comprising a step chamfer for engaging the first advance flange to the first advance nut and making the first advance flange integral with the first advance nut, the first advance flange being delimited by a first flange peripheral region configured to engage the first advance flange and make the first advance flange integral with the first stem proximal end.

13. The transfer machine of claim 1, wherein a first tool holder seat is formed at the first stem distal end, wherein said first tool holder seat is suitable for housing a plastic deformation unit or a chip removal unit, or said first tool holder seat is suitable for housing the first tool holder element.

14. The transfer machine of claim 1, wherein the first advance group further comprises the first tool holder element forming a releasable coupling with a plastic deformation unit.

15. The transfer machine of claim 14, wherein the first stem distal end is engaged to and made integral with a tool holder element advance flange, a blind tool holder element seat housing the first tool holder element being formed in the tool holder element advance flange, and wherein the tool holder element advance flange is integral with the first tool holder element and provided with a centering tang proximally protruding towards the first advance motor along the first advance screw axis, said centering tang being at least partially housed in a recess formed in the first advance recirculating ball screw.

16. The transfer machine of claim 1, further comprising a first rotation motion transmission system comprising a first rotation driving pulley engaged to a first rotation motor shaft of the first advance motor, a first rotation driven pulley and a first rotation transmission belt for transmitting motion from the first rotation driving pulley to the first rotation driven pulley, the first rotation driven pulley being engaged to the first advance recirculating ball screw and made integral with the first advance recirculating ball screw, the first rotation driving shaft extending along a first advance motor axis either parallel to or coinciding with the first advance screw axis.

17. The transfer machine of claim 1, wherein the external covering frame extends between a proximal frame portion and a distal frame portion, the distal frame portion comprising an external cylindrical surface proximally delimited by a shoulder, or by a spacer, and distally delimited by a locking ring nut, a space region extending between the shoulder, or the spacer, and the locking ring nut being suitable for being housed in one of the plurality of housing seats of the mounting table.

\* \* \* \* \*